United States Patent
Okubo et al.

(10) Patent No.: US 9,371,788 B2
(45) Date of Patent: Jun. 21, 2016

(54) VEHICLE, AND METHOD AND DEVICE FOR CONTROLLING INTERNAL COMBUSTION ENGINE

(75) Inventors: Shigeo Okubo, Anjo (JP); Yasushi Ando, Toyota (JP); Daichi Yagi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 268 days.

(21) Appl. No.: 14/004,208

(22) PCT Filed: Apr. 13, 2011

(86) PCT No.: PCT/JP2011/059147
§ 371 (c)(1),
(2), (4) Date: Sep. 10, 2013

(87) PCT Pub. No.: WO2012/140745
PCT Pub. Date: Oct. 18, 2012

(65) Prior Publication Data
US 2014/0025279 A1 Jan. 23, 2014

(51) Int. Cl.
| F02D 13/08 | (2006.01) |
| F02N 19/00 | (2010.01) |
| F02D 41/00 | (2006.01) |
| B60K 6/445 | (2007.10) |
| B60W 10/06 | (2006.01) |

(Continued)

(52) U.S. Cl.
CPC ............ *F02D 41/0002* (2013.01); *B60K 6/445* (2013.01); *B60W 10/06* (2013.01); *B60W 20/00* (2013.01); *F02D 13/08* (2013.01); *F02N 19/005* (2013.01); *B60Y 2300/437* (2013.01); *F02D 29/02* (2013.01); *F02N 2019/008* (2013.01); *F16H 3/728* (2013.01); *F16H 2037/0886* (2013.01); *F16H 2037/101* (2013.01); *F16H 2037/103* (2013.01); *F16H 2200/2007* (2013.01); *F16H 2200/2023* (2013.01); *F16H 2200/2035* (2013.01); *Y02T 10/6239* (2013.01)

(58) Field of Classification Search
CPC ... F02D 41/0002; F02D 41/047; F02D 13/08; F02D 17/04; F02N 2011/0881; F02N 19/0045; F02N 2019/008; F02N 2200/021; F02N 11/0803; B60K 6/445; B60W 20/00
USPC ......... 180/65.265, 65.28; 701/112; 123/179.4
See application file for complete search history.

(56) References Cited

U.S. PATENT DOCUMENTS

| 2005/0066933 A1* | 3/2005 | Kaita | ............... | B60K 6/445 123/198 R |
| 2006/0241851 A1* | 10/2006 | Berger | ............... | B60K 6/445 701/112 |

(Continued)

FOREIGN PATENT DOCUMENTS

| JP | 2006-299805 A | 11/2006 |
| JP | 2006-327363 A | 12/2006 |

(Continued)

*Primary Examiner* — Lindsay Low
*Assistant Examiner* — George Jin
(74) *Attorney, Agent, or Firm* — Sughrue Mion, PLLC

(57) ABSTRACT

A vehicle includes an engine in which an intake valve is provided in each of a plurality of cylinders and an ECU for controlling the engine. An intake valve provided for at least any one of the plurality of cylinders opens when an output shaft of the engine stops. The ECU changes an intake valve which opens when the output shaft of the engine stops, while the vehicle is running.

3 Claims, 9 Drawing Sheets

(51) Int. Cl.
*B60W 20/00* (2016.01)
*F16H 3/72* (2006.01)
*F16H 37/08* (2006.01)
*F16H 37/10* (2006.01)
*F02D 29/02* (2006.01)

(56) References Cited

U.S. PATENT DOCUMENTS

| | | | | |
|---|---|---|---|---|
| 2006/0266323 | A1* | 11/2006 | Ogimura | F02D 35/02 123/198 A |
| 2007/0235005 | A1* | 10/2007 | Lewis | F01L 9/04 123/322 |
| 2010/0094498 | A1* | 4/2010 | Watanabe | B60K 6/445 701/22 |
| 2011/0120789 | A1* | 5/2011 | Teraya | B60K 6/445 180/65.25 |
| 2013/0035815 | A1* | 2/2013 | Ando | B06K 6/445 701/22 |
| 2013/0255606 | A1* | 10/2013 | Nishikiori | F02D 13/08 123/90.1 |

FOREIGN PATENT DOCUMENTS

| | | |
|---|---|---|
| JP | 2009-264231 A | 11/2009 |
| JP | 2010-083232 A | 4/2010 |
| JP | 2010-185460 A | 8/2010 |

\* cited by examiner

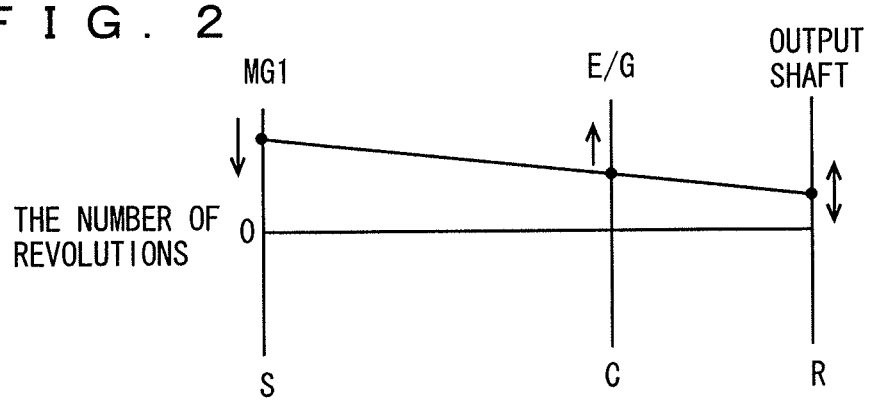
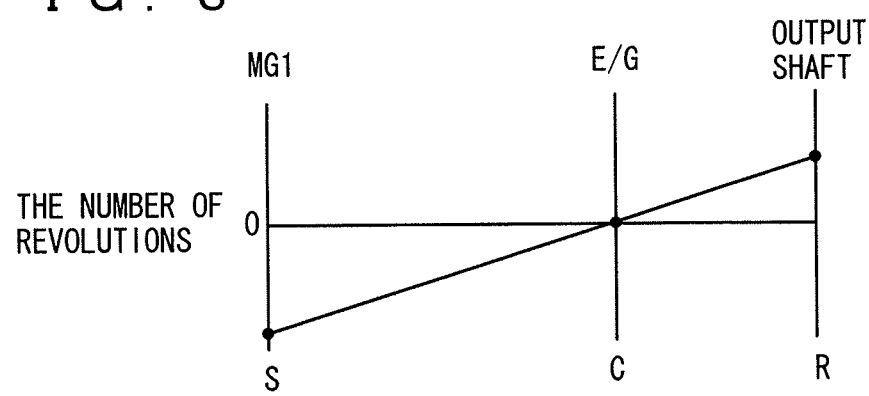
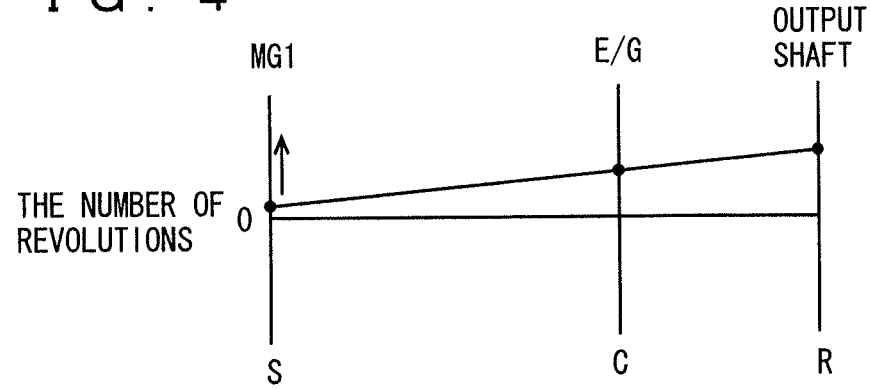

F I G. 5
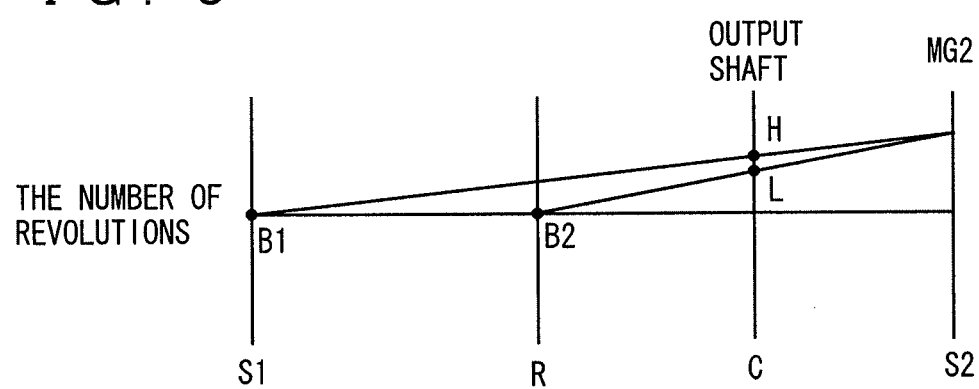

VEHICLE, AND METHOD AND DEVICE FOR CONTROLLING INTERNAL COMBUSTION ENGINE

CROSS REFERENCE TO RELATED APPLICATIONS

This application is a National Stage of International Application No. PCT/JP2011/059147 filed Apr. 13, 2011, the contents of all of which are incorporated herein by reference in their entirety.

TECHNICAL FIELD

The present invention relates to a vehicle and a method and a device for controlling an internal combustion engine, and particularly to a technique for controlling an internal combustion engine in which an intake valve is provided in each of a plurality of cylinders and an intake valve provided for at least any one of the plurality of cylinders opens when an output shaft stops.

BACKGROUND ART

A hybrid car incorporating an electric motor serving as a drive source in addition to an engine has been marketed. A hybrid car may be categorized as one type of an electric car. A hybrid car can run only with an electric motor serving as a drive source. Therefore, as described in Japanese Patent Laying-Open No. 2010-83232, the engine may intermittently be stopped.

CITATION LIST

Patent Document

PTD 1: Japanese Patent Laying-Open No. 2010-83232

SUMMARY OF INVENTION

Technical Problem

As is well known, a multi-cylinder internal combustion engine used as an engine is provided with an intake valve for each cylinder. Generally, an intake valve opens and closes as a camshaft rotates. The camshaft is coupled to a crankshaft and it rotates as the crankshaft rotates. Therefore, the intake valve opens and closes at a crank angle different for each cylinder as the crankshaft rotates. Thus, while the crankshaft remains stopped, an intake valve provided for at least any one cylinder among the plurality of cylinders may open. When a vehicle runs in such a state, an airflow scavenges a cylinder of which intake valve is open. Therefore, fuel which adheres to the inside of the cylinder and an intake port may volatilize.

When adhering fuel volatilizes only in some cylinders, at the time of subsequent start of the engine, only an air-fuel ratio in the cylinder of which intake valve has been open becomes higher than an air-fuel ratio in other cylinders. Consequently, a state of fuel becomes imbalanced among the cylinders. Then, torque may greatly fluctuate. Starting capability of the engine may thus become poor.

An object of the present invention is to improve starting capability of an engine.

Solution to Problem

In one embodiment, a vehicle includes an internal combustion engine in which an intake valve is provided in each of a plurality of cylinders and a control unit that controls the internal combustion engine. An intake valve provided for at least any one of the plurality of cylinders opens when an output shaft of the internal combustion engine stops. The control unit changes an intake valve which opens when the output shaft of the internal combustion engine stops, while the vehicle is running.

According to this embodiment, as the intake valve which opens when the output shaft of the internal combustion engine stops is changed, a scavenged cylinder is changed. Therefore, in a plurality of cylinders, fuel which has adhered to the inside of the cylinder and the intake port may volatilize. Thus, imbalance in air-fuel ratio is lessened and torque fluctuation at the time of start of the internal combustion engine is reduced. Consequently, the internal combustion engine used as the engine starts well.

In another embodiment, the control unit changes an intake valve which opens, when a time period during which the output shaft of the internal combustion engine remains stopped exceeds a predetermined time period.

According to this embodiment, an intake valve which opens is changed every predetermined time. Therefore, fuel is prevented from volatilizing only in some cylinders.

In yet another embodiment, the intake valve opens and closes at a crank angle different for each cylinder as the output shaft of the internal combustion engine rotates. The control unit changes an intake valve which opens, by rotating the output shaft of the internal combustion engine by a predetermined crank angle.

According to this embodiment, by rotating the output shaft of the internal combustion engine by a predetermined crank angle, any intake valve can be opened.

Advantageous Effects of Invention

As the intake valve which opens when the output shaft of the internal combustion engine stops is changed, a scavenged cylinder is changed. Therefore, in a plurality of cylinders, fuel which has adhered to the inside of the cylinder and the intake port may volatilize. Thus, imbalance in air-fuel ratio is lessened and torque fluctuation at the time of start of the internal combustion engine is reduced. Consequently, the internal combustion engine used as the engine starts well.

BRIEF DESCRIPTION OF DRAWINGS

FIG. 2 is a nomographic chart of a power split device.

FIG. 3 is a nomographic chart when an engine stops.

FIG. 4 is a nomographic chart when the engine is motored or cranked.

FIG. 5 is a nomographic chart of a transmission.

DESCRIPTION OF EMBODIMENTS

Figure 1:
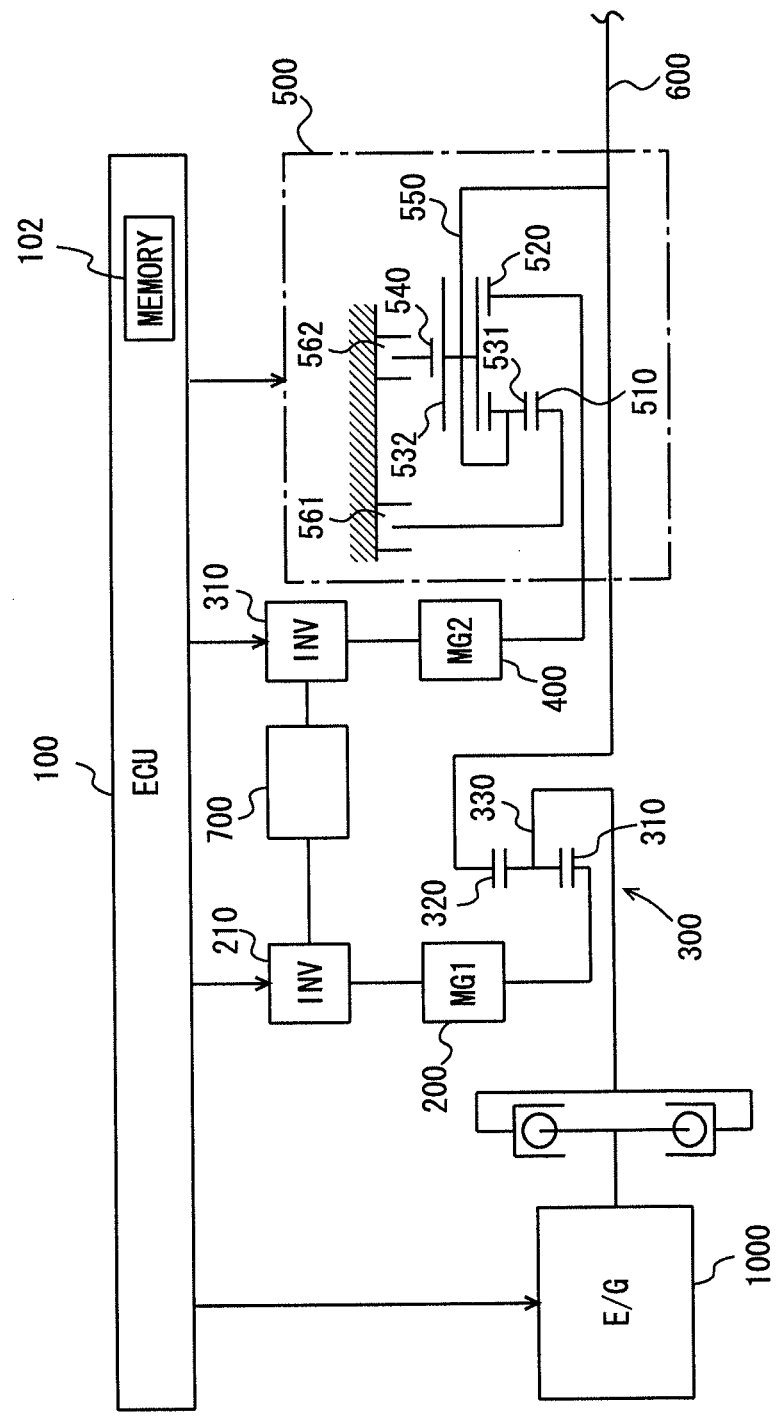
FIG. 1 is a schematic configuration diagram showing a powertrain of a hybrid car.

An embodiment of the present invention will be described hereinafter with reference to the drawings. In the description below, the same elements have the same reference characters allotted. Their label and function are also identical. Therefore, detailed description thereof will not be repeated.

A powertrain of a hybrid car will be described with reference to FIG. 1. The powertrain includes an engine 1000, a first motor generator 200, a power split device 300 for combining or distributing torque between these engine 1000 and first motor generator 200, a second motor generator 400, and a transmission 500.

Engine 1000 is a known internal combustion engine outputting motive power by burning fuel therein, and it is configured such that operation states such as a throttle position (an intake amount), an amount of fuel supply, ignition timing, and the like can electrically be controlled. Engine 1000 is controlled, for example, by an ECU (Electronic Control Unit) 100 configured with a microcomputer and a memory 102. ECU 100 may be divided into a plurality of ECUs.

First motor generator 200 is a three-phase AC rotating electric machine by way of example and it has a function as a motor and a function as a generator. First motor generator 200 is connected to a power storage device 700 such as a battery with an inverter 210 being interposed. By controlling inverter 210, output torque or regenerative torque of first motor generator 200 is set as appropriate and control thereof is carried out by ECU 100. It is noted that a stator (not shown) of first motor generator 200 is fixed and it does not rotate.

Power split device 300 is a known gear mechanism producing a differential action with three rotating elements of a sun gear (S) 310 which is an external gear, a ring gear (R) 320 which is an internal gear arranged concentrically with sun gear (S) 310, and a carrier (C) 330 holding a pinion gear engaged with these sun gear (S) 310 and ring gear (R) 320 in a manner allowing free rotation and revolution thereof. An output shaft of engine 1000 is coupled to carrier (C) 330 which is the first rotating element with a damper being interposed. In other words, carrier (C) 330 serves as an input element.

Meanwhile, a rotor (not shown) of first motor generator 200 is coupled to sun gear (S) 310 which is the second rotating element. Therefore, sun gear (S) 310 serves as what is called a reaction force element, and ring gear (R) 320 which is the third rotating element serves as an output element. Then, ring gear (R) 320 is coupled to an output shaft 600 coupled to a drive wheel (not shown).

FIG. 2 shows a nomographic chart of power split device 300. As shown in FIG. 2, as reaction force torque from first motor generator 200 is input to sun gear (S) 310 against torque output from engine 1000 which is input to carrier (C) 330, torque of magnitude calculated by addition and subtraction of torque appears in ring gear (R) 320 serving as the output element. In that case, the rotor of first motor generator 200 rotates with that torque, and first motor generator 200 functions as a power generator. Meanwhile, in the case where the number of revolutions (the output number of revolutions) of ring gear (R) 320 is constant, the number of revolutions of engine 1000 can vary continuously (in a stepless manner) by varying the number of revolutions of first motor generator 200 to become smaller or greater. Namely, control for setting the number of revolutions of engine 1000, for example, to the number of revolutions at which fuel efficiency is highest can be carried out by controlling first motor generator 200. Such control is carried out by ECU 100.

As shown in FIG. 3, if the output shaft of engine 1000, that is, the crankshaft, is stopped during running, first motor generator 200 rotates in a reverse direction. As first motor generator 200 is caused to function as an electric motor from this state to output torque in a direction of forward rotation, torque in the direction of forward rotation of engine 1000 is applied to engine 1000 coupled to carrier (C) 330. Consequently, as shown in FIG. 4, the output shaft of engine 1000 can be rotated by first motor generator 200. Namely, engine 1000 can be motored or cranked by first motor generator 200.

Referring back to FIG. 1, second motor generator 400 is a three-phase AC rotating electric machine by way of example and it has a function as a motor and a function as a generator. Second motor generator 400 is connected to a power storage device 700 such as a battery with an inverter 310 being interposed. A configuration is such that power running and regeneration as well as torque in each case are controlled by controlling inverter 310. It is noted that a stator (not shown) of second motor generator 400 is fixed and it does not rotate.

Transmission 500 is constituted of a set of Ravigneaux type planetary gear mechanisms. A first sun gear (S1) 510 and a second sun gear (S2) 520 each of which is an external gear are provided. A first pinion 531 is engaged with first sun gear (S1) 510, first pinion 531 is engaged with a second pinion 532, and second pinion 532 is engaged with a ring gear (R) 540 arranged concentrically with each sun gear 510, 520.

It is noted that a carrier (C) 550 holds each pinion 531, 532 in a manner allowing free rotation and revolution thereof. In addition, second sun gear (S2) 520 is engaged with second pinion 532. Therefore, first sun gear (S1) 510 and ring gear (R) 540 constitute, together with each pinion 531, 532, a mechanism corresponding to a double-pinion-type planetary gear mechanism, and second sun gear (S2) 520 and ring gear (R) 540 constitute, together with second pinion 532, a mechanism corresponding to a single-pinion-type planetary gear mechanism.

Furthermore, transmission 500 is provided with a B1 brake 561 for selectively fixing first sun gear (S1) 510 and a B2 brake 562 for selectively fixing ring gear (R) 540. These brakes 561, 562 are what is called frictional engagement elements producing engagement force with friction force, and a multiplate engagement device or a band-type engagement device can be adopted. These brakes 561, 562 are constructed such that torque capacities thereof are continuously varied with engagement force produced by a hydraulic pressure. Moreover, second motor generator 400 described previously is coupled to second sun gear (S2) 520. Carrier (C) 550 is coupled to output shaft 600.

Therefore, transmission 500 above has second sun gear (S2) 520 as what is called an input element and carrier (C) 550 as an output element, and a high-speed gear at which a gear ratio is higher than "1" is set by engaging B1 brake 561. By engaging B2 brake 562 instead of B1 brake 561, a low-speed gear higher in gear ratio than a high-speed gear is set.

Shift change between these gears is made based on a state of running such as a vehicle speed, requested driving force (or an accelerator position), or the like. More specifically, a gear region is determined as a map (a shift map) in advance and control is carried out such that any gear is set in accordance with a detected operation state.

FIG. 5 shows a nomographic chart of transmission 500. As shown in FIG. 5, as B2 brake 562 fixes ring gear (R) 540, a low-speed gear L is set, so that torque output from second motor generator 400 is amplified in accordance with a gear ratio and applied to output shaft 600. On the other hand, as B1 brake 561 fixes first sun gear (S1) 510, a high-speed gear H lower in gear ratio than low-speed gear L is set. Since the gear ratio at this high-speed gear H is also higher than "1", torque output from second motor generator 400 is increased in accordance with that gear ratio and applied to output shaft 600.

In such a state that each gear L, H is steadily set, torque applied to output shaft 600 appears as torque obtained by increasing output torque from second motor generator 400 in accordance with a gear ratio, however, in a transition state of shift change, it appears as torque affected by a torque capacity in each brake 561, 562, inertia torque involved with variation in the number of revolutions, or the like. In addition, torque applied to output shaft 600 is positive while second motor generator 400 is in a driving state and it is negative while the second motor generator is in a driven state.

In the present embodiment, a hybrid car runs in any mode of an EV mode in which driving force only from second motor generator 400 is used while engine 1000 remains stopped and an HV mode in which driving force from both or any one of engine 1000 and second motor generator 400 is used. A running mode is selected based on various parameters such as an accelerator position, a state of charge of power storage device 700, and the like.

Since a technique well known in the field of the art of hybrid cars should only be utilized for a method of selecting a running mode, further detailed description will not be repeated here. In addition, the number of modes is not limited to three.

Figure 6:
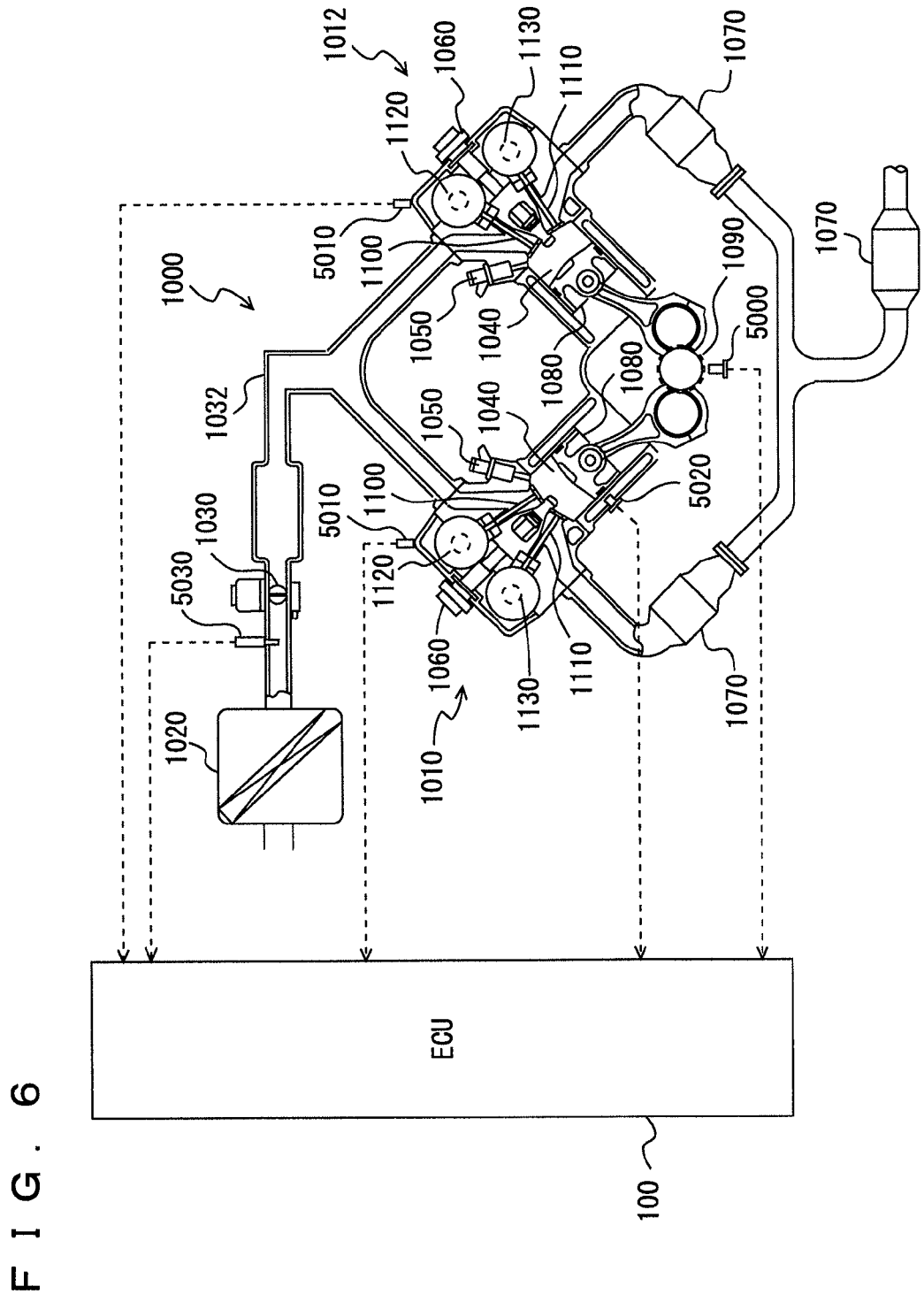
FIG. 6 is a schematic configuration diagram showing an engine of a hybrid vehicle.

Engine 1000 will further be described with reference to FIG. 6.

Engine 1000 is a V-8 engine in which groups of cylinders each consisting of four cylinders are provided in an "A" bank 1010 and a "B" bank 1012, respectively. It is noted that an engine other than the V-8 engine may also be employed. For example, a 6-cylinder engine may be employed. Any number of cylinders may be provided so long as a plurality of cylinders are provided. Other than a V-engine, an in-line engine may be employed.

In engine 1000, air is taken in through an air cleaner 1020. An amount of intake air is regulated by a throttle valve 1030. Throttle valve 1030 is an electronic throttle valve driven by a motor.

Air is introduced into a cylinder 1040 through an intake passage 1032. Air is mixed with fuel in cylinder 1040 (a combustion chamber). In cylinder 1040, fuel is directly injected from an injector 1050. Namely, an injection hole of injector 1050 is provided within cylinder 1040.

Fuel is injected in an intake stroke. It is noted that timing of injection of fuel is not limited to the intake stroke. In addition, though engine 1000 is described as a direct-injection engine in which an injection hole of injector 1050 is provided within cylinder 1040 in the present embodiment, a port injector may be provided in addition to direct injector 1050. Furthermore, only a port injector may be provided.

An air-fuel mixture in cylinder 1040 is ignited by an ignition plug 1060 and burnt. The air-fuel mixture after combustion, that is, an exhaust gas, is purified by a three-way catalyst 1070 and thereafter exhausted out of the car. As a result of combustion of the air-fuel mixture, a piston 1080 is pushed down so that a crankshaft 1090 rotates.

At a top portion of cylinder 1040, an intake valve 1100 and an exhaust valve 1110 are provided. Intake valve 1100 and exhaust valve 1110 are provided in each cylinder 1040.

Intake valve 1100 is driven by an intake camshaft 1120. Exhaust valve 1110 is driven by an exhaust camshaft 1130. Intake camshaft 1120 and exhaust camshaft 1130 are coupled to each other by a chain, a gear, or the like, and they rotate at the same number of revolutions.

Intake camshaft 1120 and exhaust camshaft 1130 are coupled to crankshaft 1090 through a chain, a belt, or the like. Therefore, intake camshaft 1120 and exhaust camshaft 1130 rotate as crankshaft 1090 rotates. Therefore, intake valve 1100 and exhaust valve 1110 open and close as crankshaft 1090 rotates. Intake valve 1100 and exhaust valve 1110 open and close at a crank angle different for each cylinder as crankshaft 1090 rotates. Therefore, intake valve 1100 provided for at least any one of a plurality of cylinders 1040 opens when engine 1000, specifically crankshaft 1090, stops.

Figure 7:
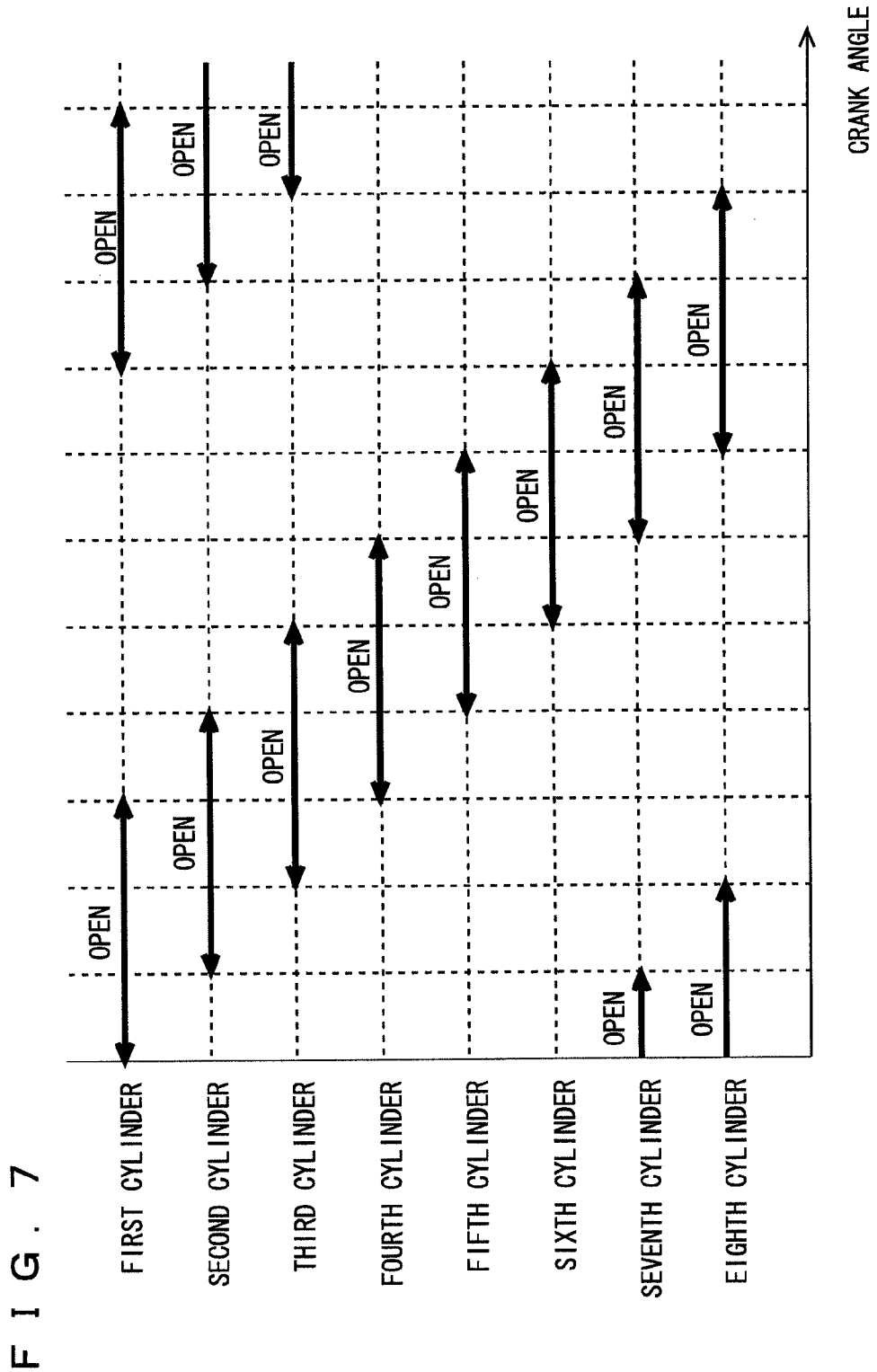
FIG. 7 is a diagram showing a crank angle at which an intake valve opens in an 8-cylinder engine.

FIG. 7 shows a crank angle at which intake valve 1100 opens for each cylinder, by way of example. "TDC" represents a top dead center. FIG. 7 is by way of example and a crank angle at which intake valve 1100 opens is not limited thereto. In addition, though intake valve 1100 opens in the order of first, second, third, fourth, fifth, sixth, seventh, and eighth cylinders in FIG. 7, the order of cylinders of which intake valves 1100 open is not limited to the order shown in FIG. 7.

Figure 8:
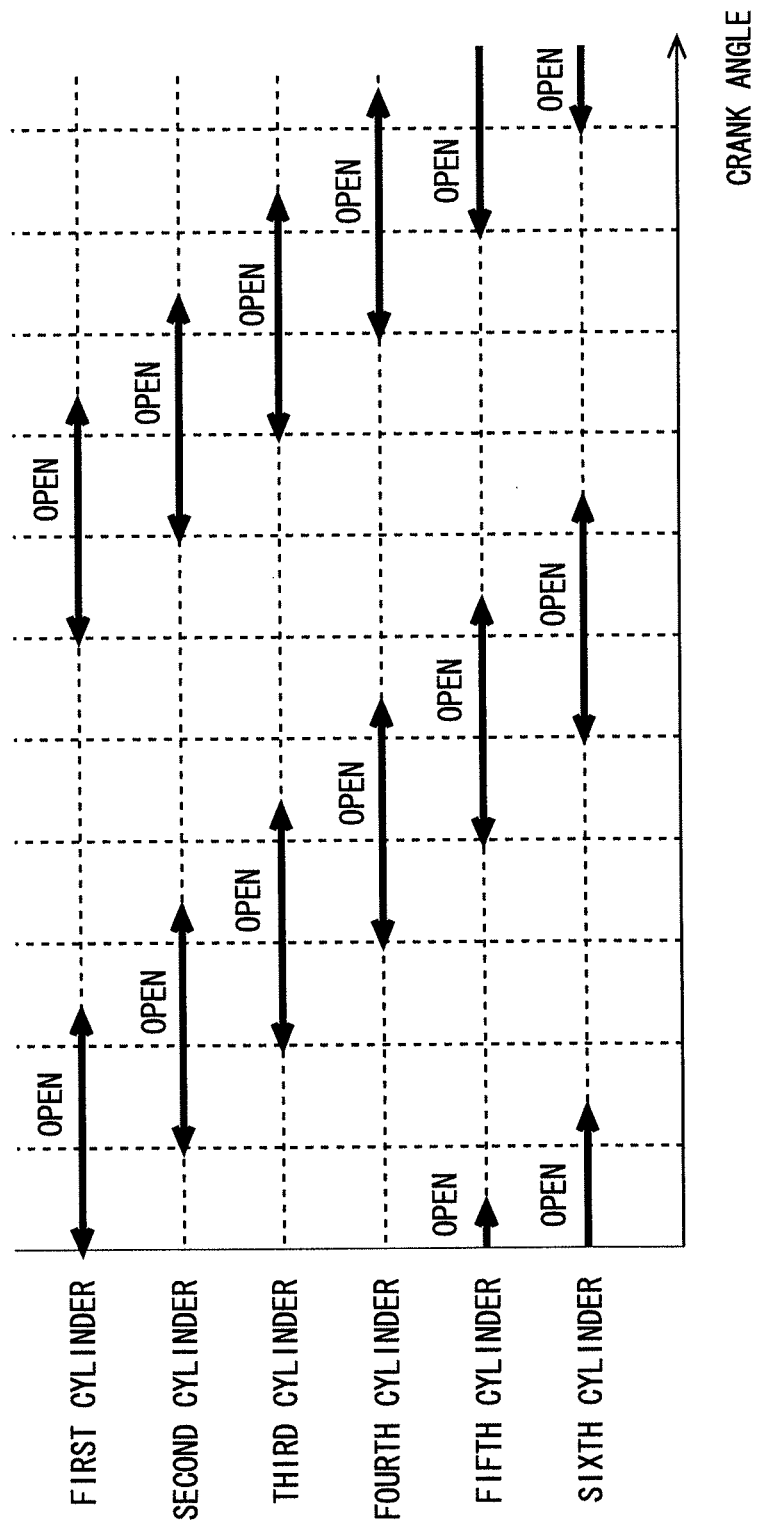
FIG. 8 is a diagram showing a crank angle at which an intake valve opens in a 6-cylinder engine.

FIG. 8 shows a crank angle at which intake valve 1100 opens for each cylinder in the case where engine 1000 is a 6-cylinder engine by way of example. FIG. 8 is by way of example and a crank angle at which intake valve 1100 opens is not limited thereto. In addition, though intake valve 1100 opens in the order of first, second, third, fourth, fifth, and sixth cylinders in FIG. 8, the order of cylinders of which intake valves 1100 open is not limited to the order shown in FIG. 8.

Referring back to FIG. 6, ECU 100 receives input of a signal indicating the number of revolutions and a crank angle of crankshaft 1090 from a crank angle sensor 5000. In addition, ECU 100 receives input of a signal indicating a phase of intake camshaft 1120 and exhaust camshaft 1130 (a position of the camshaft in a direction of rotation) from a cam position sensor 5010 (a signal indicating a phase of intake valve 1100 and exhaust valve 1110). Furthermore, a signal indicating the number of revolutions of intake camshaft 1120 and exhaust camshaft 1130 is input from cam position sensor 5010.

Moreover, ECU 100 receives input of a signal indicating a water temperature (a temperature of cooling water) of engine 1000 from a water temperature sensor 5020 and a signal indicating an amount of intake air of engine 1000 from an airflow meter 5030 (an amount of air taken into engine 1000).

ECU 100 controls a throttle position, ignition timing, fuel injection timing, an amount of fuel injection, and the like such that engine 1000 achieves a desired operation state, based on signals input from these sensors as well as on a map and a program stored in a memory (not shown).

In addition, in the present embodiment, ECU 100 changes intake valve 1100 which opens when crankshaft 1090 stops, for example, if a time period during which crankshaft 1090 remains stopped exceeds a predetermined time period during running of the vehicle in the EV mode. For example, by rotating crankshaft 1090 by a predetermined crank angle, an intake valve which opens is changed. For example, as ECU 100 drives first motor generator 200, crankshaft 1090 is rotated. Namely, engine 1000 is motored.

Figure 9:
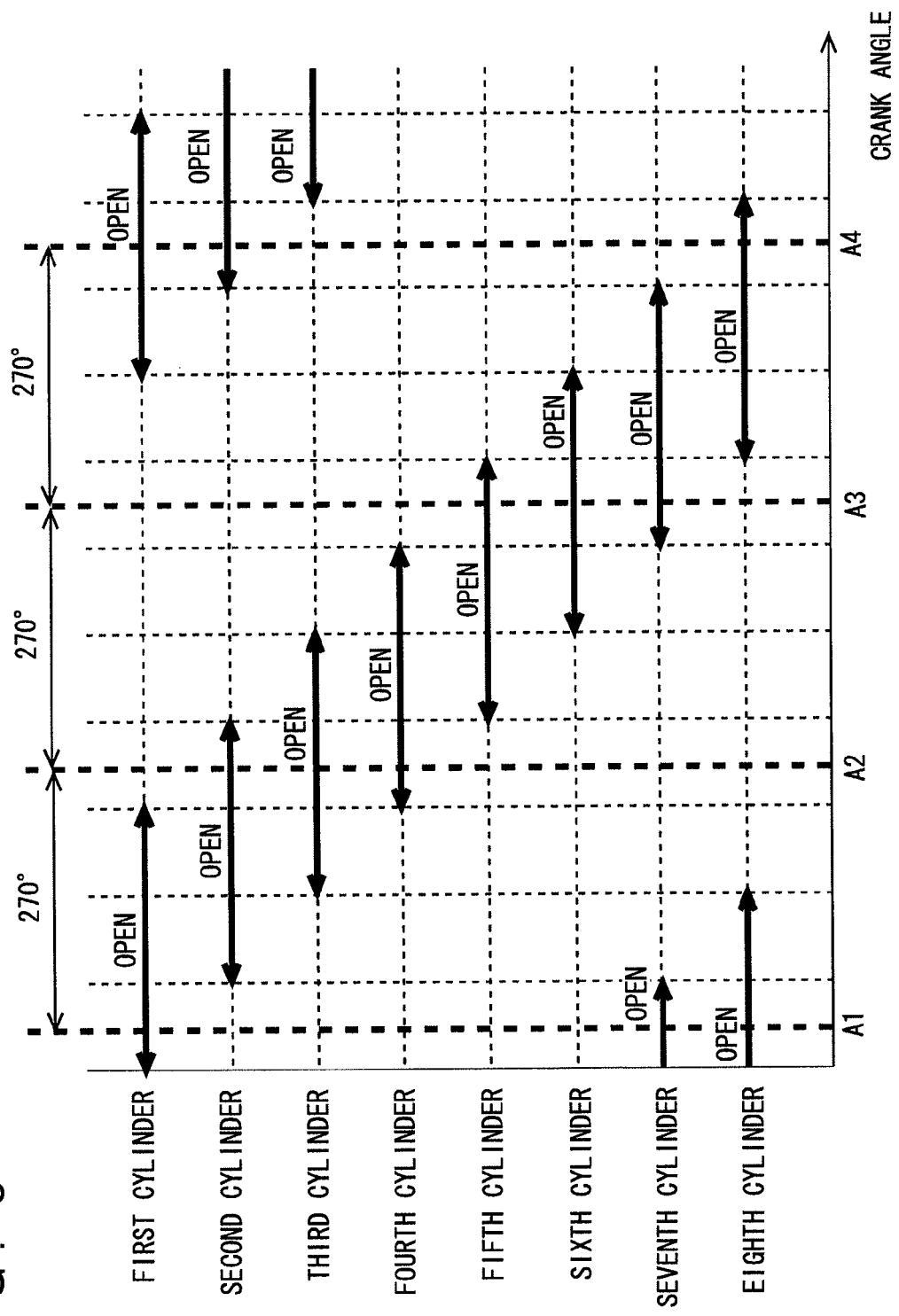
FIG. 9 is a diagram showing an angle by which a crankshaft is rotated in an 8-cylinder engine.

As shown in FIG. 9, in an 8-cylinder engine, for example, crankshaft 1090 is rotated by 270°. In FIG. 9, at a crank angle A1°, intake valves 1100 provided for the first, seventh, and eighth cylinders are opened. At a crank angle A2° (A2=A1+270), intake valves 1100 provided for the second, third, and fourth cylinders are opened. At a crank angle A3° (A3=A2+270), intake valves 1100 provided for the fifth, sixth, and seventh cylinders are opened. At a crank angle A4° (A4=A3+270), intake valves 1100 provided for first, second, and eighth cylinders are opened. FIG. 9 is by way of example and an angle by which crankshaft 1090 is to be rotated is not limited to 270°.

Figure 10:
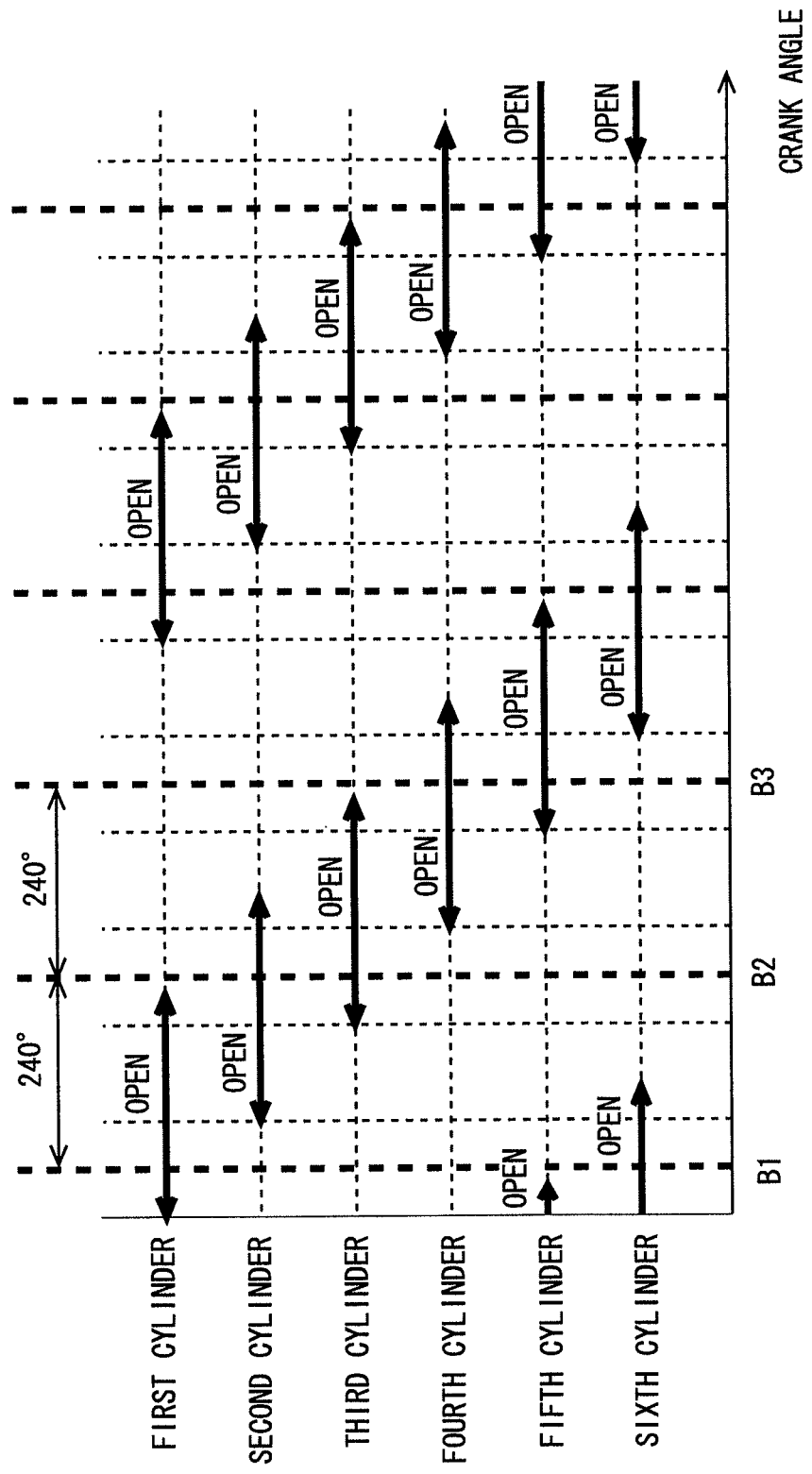
FIG. 10 is a diagram showing an angle by which a crankshaft is rotated in a 6-cylinder engine.

As shown in FIG. 10, in a 6-cylinder engine, for example, crankshaft 1090 is rotated by 240°. In FIG. 10, at a crank angle B1°, intake valves 1100 provided for the first and sixth cylinders are opened. At a crank angle B2° (B2=B1+240), intake valves 1100 provided for the second and third cylinders are opened. At a crank angle B3° (B3=B2+240), intake valves 1100 provided for the fourth and fifth cylinders are opened. FIG. 10 is by way of example and an angle by which crankshaft 1090 is to be rotated is not limited to 240°.

Figure 11:
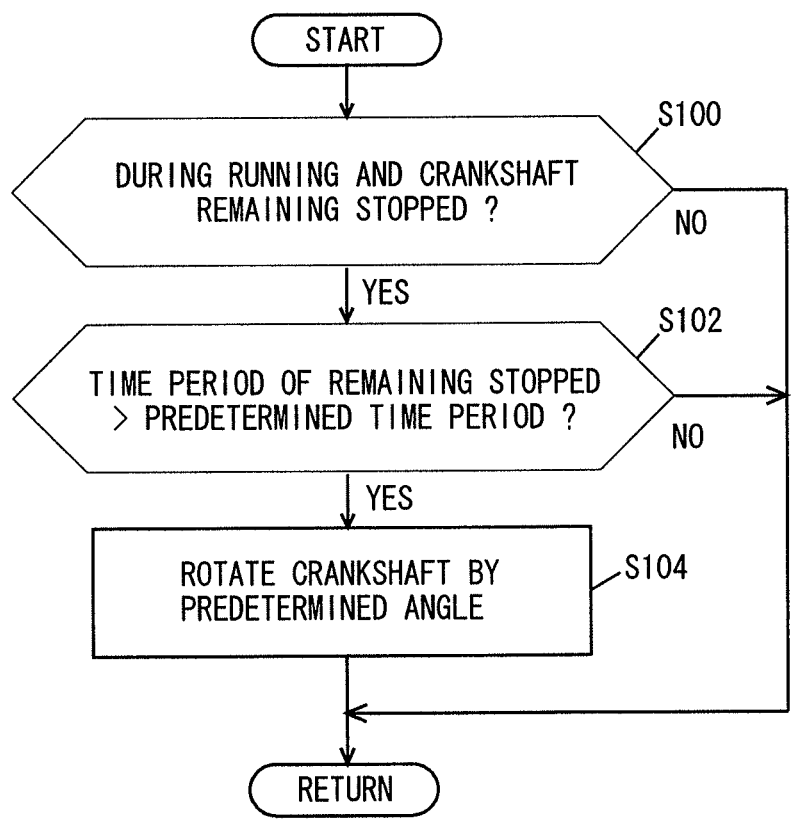
FIG. 11 is a flowchart showing processing performed by an ECU.

Processing performed by ECU 100 in the present embodiment will be described with reference to FIG. 11. ECU 100 may perform processing with software, or with hardware, or with software and hardware in cooperation.

In step (hereinafter a step being abbreviated as S) 100, whether or not the vehicle is running and crankshaft 1090 remains stopped is determined. For example, when a vehicle speed is higher than zero and a rotation speed of crankshaft 1090 is zero, it is determined that the vehicle is running and crankshaft 1090 remains stopped.

When the vehicle is running and crankshaft 1090 remains stopped (YES in S100), in S102, whether or not a time period during which crankshaft 1090 remains stopped has exceeded a predetermined time period is determined.

When a time period during which crankshaft 1090 remains stopped has exceeded a predetermined time period (YES in S102), in S104, first motor generator 200 is driven so that crankshaft 1090 is rotated by a predetermined crank angle.

As described above, in the present embodiment, while the vehicle is running, intake valve 1100 which opens when crankshaft 1090 of engine 1000 stops is changed. Thus, scavenged cylinder 1040 is changed and fuel that has adhered to the inside of cylinder 1040 and the intake port may volatilize in a plurality of cylinders 1040. Therefore, imbalance in air-fuel ratio is lessened and torque fluctuation at the time of subsequent re-start of engine 1000 is reduced. Consequently, engine 1000 starts well.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

100 ECU; 102 memory; 200 first motor generator; 210 first inverter; 300 power split device; 310 second inverter; 400 second motor generator; 500 transmission; 600 output shaft; 700 power storage device; 1000 engine; 1040 cylinder; 1090 crankshaft; 1100 intake valve; 1120 intake camshaft; 1130 exhaust camshaft; 5000 crank angle sensor; and 5010 cam position sensor.

The invention claimed is:

1. A vehicle, comprising:
an internal combustion engine in which an intake valve is provided in each of a plurality of cylinders; and
a control unit configured to control said internal combustion engine, wherein
an intake valve provided for at least one of said plurality of cylinders opens when an output shaft of said internal combustion engine stops, and
each time when a stop state of the output shaft of said internal combustion engine during a vehicle running continues for a predetermined time period, said control unit is configured to change an intake valve that is to be opened when the output shaft of said internal combustion engine stops.

2. The vehicle according to claim 1, wherein
said intake valve opens and closes at a crank angle different for each said cylinder as the output shaft of said internal combustion engine rotates, and
said control unit changes an intake valve which opens, by rotating the output shaft of said internal combustion engine by a predetermined crank angle.

3. A method for controlling an internal combustion engine in which an intake valve is provided in each of a plurality of cylinders and an intake valve provided for at least one of said plurality of cylinders opens when an output shaft stops, comprising:
stopping said output shaft; and
changing, each time when a stop state of the output shaft of said internal combustion engine during a vehicle running continues for a predetermined time period, an intake valve that is to be opened when the output shaft of said internal combustion engine stops.

* * * * *